United States Patent
Nitzan et al.

(10) Patent No.: US 10,498,655 B1
(45) Date of Patent: Dec. 3, 2019

(54) DYNAMICALLY ADJUSTING LOAD ON AN OVER-THE-TOP (OTT) DELIVERY NETWORK

(71) Applicant: Harmonic, Inc., San Jose, CA (US)

(72) Inventors: Raz Nitzan, Caesarea (IL); Patrick Gendron, Chateaugiron (FR); Raoul Monnier, Noyal sur Vilaine (FR); Khaled Jerbi, Rennes (FR)

(73) Assignee: Harmonic, Inc., San Jose, CA (US)

( * ) Notice: Subject to any disclaimer, the term of this patent is extended or adjusted under 35 U.S.C. 154(b) by 0 days.

(21) Appl. No.: 16/019,390

(22) Filed: Jun. 26, 2018

Related U.S. Application Data

(60) Provisional application No. 62/525,626, filed on Jun. 27, 2017.

(51) Int. Cl.
| | |
|---|---|
| *H04L 12/803* | (2013.01) |
| *H04L 29/06* | (2006.01) |
| *H04L 12/24* | (2006.01) |
| *H04N 21/24* | (2011.01) |
| *H04L 12/911* | (2013.01) |
| *H04N 19/164* | (2014.01) |

(52) U.S. Cl.
CPC ........ *H04L 47/125* (2013.01); *H04L 41/0896* (2013.01); *H04L 47/78* (2013.01); *H04L 65/601* (2013.01); *H04L 65/607* (2013.01); *H04N 19/164* (2014.11); *H04N 21/2402* (2013.01)

(58) Field of Classification Search
CPC ... H04L 47/125; H04L 41/0896; H04L 47/78; H04L 65/607; H04L 65/601; H04L 47/10; H04N 19/164; H04N 21/2402; H04W 28/0273; H04W 28/0268; H04W 28/0263; H04W 28/0257; H04W 28/0252; H04W 28/0247; H04W 28/021; H04W 28/0205; H04W 28/02
See application file for complete search history.

(56) References Cited

U.S. PATENT DOCUMENTS

| | | | | |
|---|---|---|---|---|
| 9,215,606 | B2 * | 12/2015 | Blicker | H04W 24/02 |
| 9,438,935 | B2 * | 9/2016 | McDysan | H04N 21/222 |
| 9,800,683 | B2 * | 10/2017 | Phillips | H04L 47/26 |
| 2013/0254815 | A1 * | 9/2013 | Pfeffer | H04N 21/25891 |
| | | | | 725/96 |

(Continued)

*Primary Examiner* — Sharad Rampuria
(74) *Attorney, Agent, or Firm* — Brokaw Patent Law PC; Christopher J. Brokaw

(57) ABSTRACT

Dynamically managing an operation of a content delivery network (CDN) to address excessive load upon an upload link for updating data thereto and/or upon particular portions of the CDN. A network optimizer may receive bit rate utilization data that identifies a current bit rate amount being utilized by the upload link and what digital video data is being uploaded to the CDN thereon. The network optimizer may also receive, from an analytic server, consumption information about the current load being experienced throughout different regions of the CDN. The network optimizer analyses the bit rate utilization data and the consumption information to dynamically render any changes necessary to the bit rate utilization of the upload link and to the representations of digital video propagated to some or all portions of the CDN to ensure the load remains below a predetermined threshold in both the upload link and throughout the CDN.

18 Claims, 5 Drawing Sheets

(56) References Cited

U.S. PATENT DOCUMENTS

2015/0172345 A1* 6/2015 Mantin .................. H04L 65/60
709/219
2016/0295429 A1* 10/2016 Enqvist .................. H04W 4/18

* cited by examiner

DYNAMICALLY ADJUSTING LOAD ON AN OVER-THE-TOP (OTT) DELIVERY NETWORK

CLAIM OF PRIORITY

The present application claims priority to U.S. Provisional Patent Application No. 62/525,626, entitled "Protecting Total Throughput of Variable Bit Rate (VBR) OTT Services From Exceeding a Threshold," filed on Jun. 27, 2017, the disclosure of which is hereby incorporated by reference for all purposes in its entirety as if fully set forth herein.

FIELD OF THE INVENTION

Embodiments of the invention generally relate to the field of the delivery of video content, and more particularly, relate to the encoding and transcoding of video content for delivery by an Over-The-Top (OTT) platform.

BACKGROUND

The consumption of video content delivered over a network has dramatically increased over time due, at least in part, to the availability of VOD (Video On Demand) services and live services as well as to the multiplication of devices having network access. By way of example only, video content can be accessed from various kinds of terminals such as smart phones, tablets, personal computers (PCs), televisions, Set Top Boxes, and game consoles. Video content may also be distributed over various types of networks including, but not limited to, broadcast, cable, satellite, cellular, ADSL, and fiber.

Video content can be characterized by different parameters; an example of one such parameter is a spatial resolution parameter which defines the number of horizontal and vertical pixels for the video content. While the resolution may be identified a variety of different notations, in practice the resolution typically corresponds to one of a number of standard resolutions that have been defined. Popular resolutions available today include 480p (720×480 pixels), 576p (720×576 pixels), 720p (1280×720 pixels), 1080i (1920×1080 pixels split in two interlaced fields of 540 lines), 1080p (1920×1080 pixels), 2160p (3840×2160 pixels) and 4320p (7680×4320 pixels). The resolutions 720p, 1080i and 1080p are generally referred as "HD" (High Definition) or "HDTV" (High Definition Television), the resolution 1080p can also be referred to as "Full HD" (Full High Definition). Resolutions 2160p and 4320p may also be referred to as "UHD" (Ultra High definition) or "UHDTV" (Ultra High Definition Television), resolution 2160p may also be referred to as "4K UHD" (4 kilo Ultra High Definition), and resolution 4320p may be known as "8 k UHD" (8 kilo Ultra High Definition).

Due to the large size of raw video, video content is generally accessed in compressed form. Video content is therefore digital expressed or represented using a particular video compression standard. The most widely used video standards belong to the "MPEG" (Motion Picture Experts Group) family, which notably comprises the MPEG-2, AVC (Advanced Video Compression which is also called H.264) and HEVC (High Efficiency Video Compression, which is also called H.265) standards.

The term OTT (Over-The-Top) refers to video delivery platforms that delivers video content over an unmanaged IP network, such as the Internet. In OTT delivery, video content which can be requested is made available in a number of different representations. A representation is a particular manner of expressing video content. For example, a representation of a particular digital video may be characterized by a particular spatial resolution, a particular bit rate, a particular compression format, a particular set of encoding options, and a particular set of packaging information.

Packaging information may correspond to a file format and file extension used to represent the digital video. Video clients, which play digital video, are generally able to parse some, but not all, file formats, and so the packaging information is used when identifying whether a video client can play a particular representation. A video client, capable of playing requested video content, may receive information about the representations that are available for a particular digital video in a manifest file.

Digital video may be split into a succession of small files, called segments, which are encoded in all available representations. To play a requested digital video, the video client downloads and plays the segments in the representation of interest. When the bandwidth available to the video client fluctuates, the video client may download video segments encoded at a different bit rate in accordance with the available bandwidth.

A factor in the bit rate available to a video decoding device for receiving digital video is the type of connection over which the digital video is transmitted. For example, a set-top box or a PC using Wi-Fi or a wired connection may be capable of receiving video of a high quality and, therefore, a high bit rate. On the other hand, a mobile device using a 3G connection to connect with the Internet may only be capable of receiving video with a low quality at a low bitrate.

The large diversity of video decoding devices, video compression standards, video resolutions, and available bit rates therefore results in a need for a large combination of representations for a single digital video to serve a wide range of customers across heterogeneous networks.

Digital video is typically delivered over an Internet Protocol (IP) network using a Content Delivery Network (CDN). A CDN typically comprises a large number of servers. An origin or headend server of the CDN is responsible for storing and supplying the video content across the network to video clients that request the video content. If a large number of video clients are present in a region, then the CDN may deploy a server called an edge server in that region for scalability considerations. The edge server may handle the requests for digital video issued by the video clients in that region and eventually send those requests to the headend server. When a plurality of requests for the same digital video are received by an edge server, the edge server need only send the first request for this particular content to the headend server regardless of how many subsequent times that particular content is requested by video clients in that region. After an edge server receives segments from the requested content from the headend server, the edge server may store or cache these segments so that they may be used to satisfy additional requests for the same content without requesting the content again from the headend server. In this fashion, the use of edge servers allows for bandwidth between headend and edge servers to be conserved.

Traditional Adaptive Bit Rate (ABR) type delivery in the context of an OTT service have been primary implemented using Constant Bit Rate (CBR) video streams. In a Constant Bit Rate (CBR) video stream, the required bandwidth for that video stream is indicated in the corresponding manifest file. However, using certain advanced encoding schemes, such as Variable Bit Rate (VBR) and capped Variable Bit Rate, the size of each segment, when encoded with a maximum bit rate constraint, will not necessarily be the same, as the size of each segment depends not only on the maximum bit rate but also on video complexity using encoding using such advanced encoding schemes.

Traditionally, segments are referenced in a manifest file using the segment's maximum possible bit rate. Thus, it can be very difficult for an operator of a CDN to know at any given time the actual load (i.e., consumed bandwidth) at different locations of the CDN. In many cases, the service provider that makes available a certain amount of content (being live or on-demand) on the CDN does not own the full delivery chain and contracts with the CDN provider on the basis of a certain traffic load (i.e., the maximum load that the CDN provider expects to be able to provide to all customers). As a result of the difficulties in ascertaining the exact load being experienced across locations of a CDN at any given time, the content owner/video service provider often must contract for a greater amount of service from an operator of a CDN than is actually needed by the content owner/video service provider. Additionally, the operator of the CDN often is required to overinvest in hardware and software to support the CDN, resulting in inefficient use of financial and computational resources.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for dynamically managing an operation of a content delivery network (CDN) are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Figure 1:
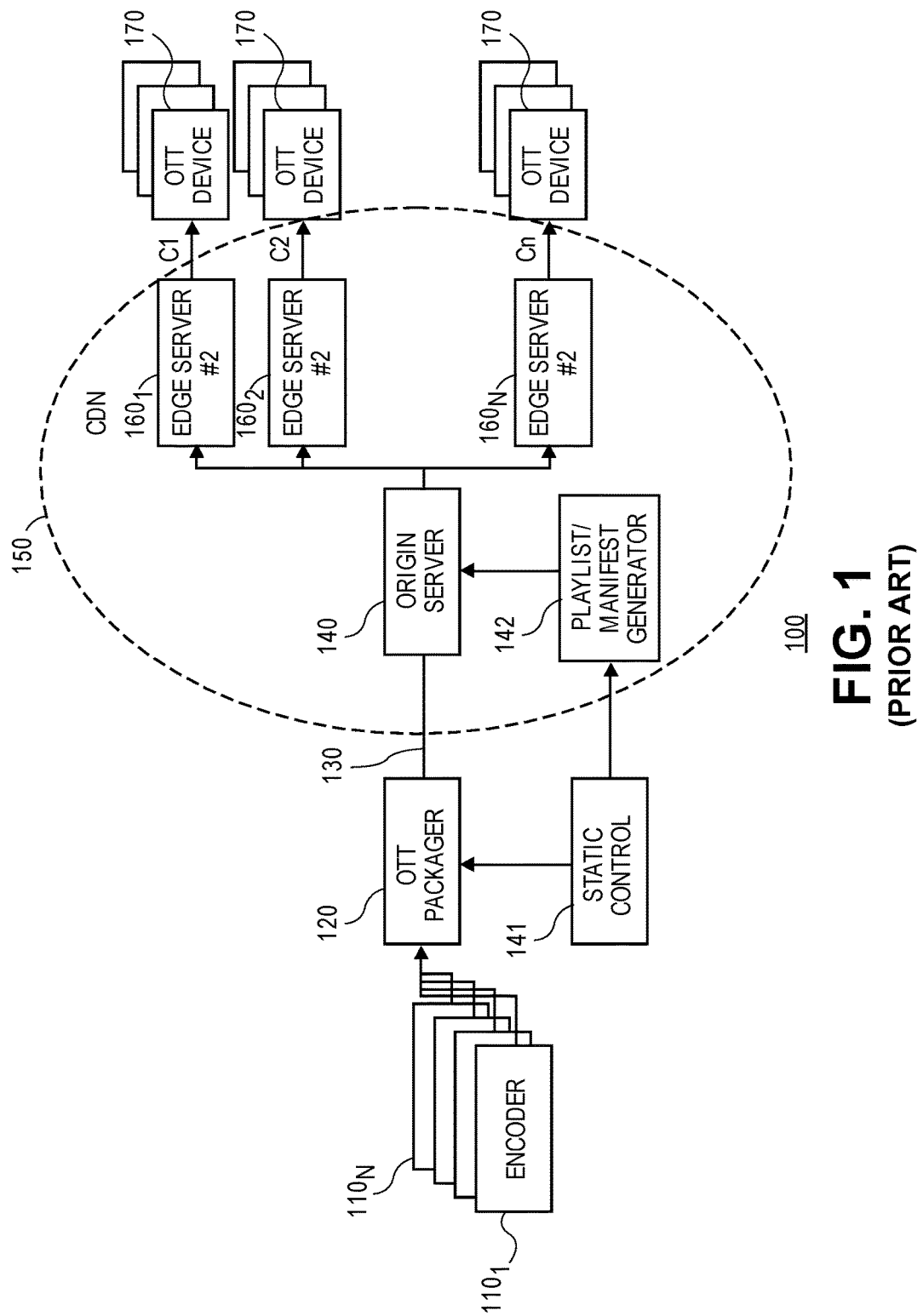
FIG. 1 is an illustrative Over-The-Top (OTT) platform according to the prior art.

Illustration of Congestion Experienced by Current Systems in Upload Link and within the CDN FIG. 1 is an illustrative Over-The-Top (OTT) platform 100 for providing digital video, upon request, over an Internet Protocol (IP) network according to the current state of the art. The OTT platform 100 of the prior art depicted in FIG. 1 comprises a variety of components, namely one or more encoders 110, OTT packager 120, upload link 130, origin server 140, static control 141, playlist/manifest generator 142, Content Delivery Network (CDN) 150, one or more edge servers 160, and one or more OTT devices 170. Each of these OTT platform 100 components are well-known to those in the art and will be described briefly below.

One or more encoders 110 may each be embodied by a hardware device, or more commonly, software executing upon a physical machine. An encoder is responsible for compressing (which includes both encoding and transcoding) digital video into a compressed format using a particular codec. To provide a concrete example of an encoder, an encoder 110 may be embodied by one of the Electra family of products available from Harmonic, Inc. of San Jose, Calif.

OTT packager 120 may be embodied by a hardware device, or more commonly, software executing upon a physical machine. OTT packager 120 is responsible for the preparation of the delivery segments as well as transmitting encoded content over upload link 130 to origin server 140. In preparing content for transmittal of upload link 130, playlist/manifest generator 142 may create a manifest file for the content. The configuration of these different elements may be accomplished using static information provided by static control 141.

Upload link 130, as broadly used herein, refers to the link between OTT packager 120 and origin server 140. Upload link 130 comprises multiple channels to a single entry-point within Content Delivery Network (CDN) 150.

Origin server 140, which may also be referred to as a headend server, the origin server 140 is responsible for storing and supplying the video content across Content Delivery Network 150 to video clients that request the video content. Origin server 140 serves as the entry point to Content Delivery Network 150.

Playlist/manifest generator 142 may be embodied by a computer system or by software executing upon physical hardware. Playlist/manifest generator 142 is responsible for generating manifest files and playlists for digital video served by origin server 140. Playlist/manifest generator 142 may be instructed in a static manner by static control 141.

Content Delivery Network (CDN) 150 is a geographically distributed network of proxy servers and their data centers. CDN 150 may be used to delivery digital video over an unmanaged computer network, such as the Internet, to requestors, such as OTT devices 170.

One or more edge servers 160, as broadly used herein, refer to servers deployed within CDN 150 which handle requests for content from OTT devices 170 within the same region. When requests for the same digital video are received by an edge server, the edge server need only send the first request for this particular content to origin server 140 regardless of how many subsequent times that particular content is requested by video clients in that region. After origin server 140 provides segments of digital video, requested by the initial request, to the edge server, those segments of digital video may be stored, or cached, near that edge server for servicing future requests. In this fashion, the use of edge servers allows for bandwidth between origin server 140 and edge servers 150 to be conserved.

One or more OTT devices 170, as broadly used herein, each represent an individual physical device which requests a representation of digital video from the CDN 150 so that it may be played upon that OTT device. Non-limiting, illustrative examples of an OTT device 170 include a web browser or software application executing on a cell phone, PC, tablet computer, portable computer, connected TV, set-top-box and the like.

The traffic load experienced by the Over-The-Top (OTT) delivery platform 100 of FIG. 1 is highly variable, as it depends, among other factors, upon content popularity and the bit rate at which every requested representation is encoded. This variability in the traffic load of an Over-The-Top (OTT) delivery platform 100 makes it difficult for network engineers to perform network planning to reduce network infrastructure cost and prevent network congestion.

The highly variable traffic load of the OTT delivery platform 100 introduces further difficulties, as the operator of the OTT delivery platform is often required, by contractual obligation, to ensure that delivered content is done so in accordance with certain operational minimum standards. Consequently, this exacerbates the issue of network infrastructure cost reduction, as the operator is essentially obligated to overinvest in the delivery capabilities the Over-The-Top (OTT) delivery platform 100 based on the poor visibility into the actual load being experienced across OTT delivery platform 100.

To explain why the variable traffic load of the OTT delivery platform 100 causes such difficulties, consider that upload link 130, which is the link between OTT packager 120 and origin server 140, can suffer from congestion. Multiple encoders $110_1$-$110_N$ working in a constant bit rate (CBR) or a capped Variable Bit Rate (cappedVBR) or a Variable Bit Rate (VBR) mode may produce digital video compressed at variable concatenated bit rates. To address the potential variability in the bit rate at which digital video is compressed by encoders $110_1$-$110_N$, network engineers assume that each encoder 110 is encoding digital video at its highest potential bit rate. Therefore, upload link 130 is designed to accommodate the sum of the maximum bit rate at which each of encoders $110_1$-$110_N$ can operate.

As a consequence of upload link 130 being oversized (that is to say, capable of supporting a load which is not typically experienced except for rare peak events), the costs involved in maintaining upload link 130 are highly than necessary. For example, operators that own the OTT delivery network must support a total throughput of the maximum bit rate multiplied by the number of channels within upload link 130, while operators that lease a network service have to purchase a network service that supports total throughput of "max-rate X number of channels" instead of X % of sum of max rate.

Another difficulty caused by the variable traffic load on the OTT delivery platform 100 manifests insides of CDN 150, e.g., between origin server 140 and each edge server 160 as well as between each edge server 160 and the OTT devices 170 serviced thereby. When many OTT devices 170 request the same digital video contemporaneously, the resulting congestion that occurs between origin server 140 and each edge server 160 as well as between the edge server 160 of the requesting OTT devices 170 can cause a degradation of the delivery of the requested digital video. The solution used today to avoid such degradation is to oversize the infrastructure to guarantee that CDN 150 will support the peak traffic load. Doing so involves adding material resources (additional edge servers 160, stronger trunks, and so on) to CDN 150 and/or subscribing to a higher price CDN contract. Moreover, the delivery network conditions may change depending upon the time of day and day of the week; thus, the peak traffic load upon the CDN 150 is typically not representative of usual operating conditions.

Addressing Congestion within the Upload Link to a CDN

Embodiments of the invention may be used to address the congestion that occurs in upload link 130 as well as within CDN 150. Prior to discussing how embodiments may mitigate and address problems associated with excessive load at various locations within CDN 150, approaches for addressing the load placed upon upload link 130 will be presented.

Figure 2:
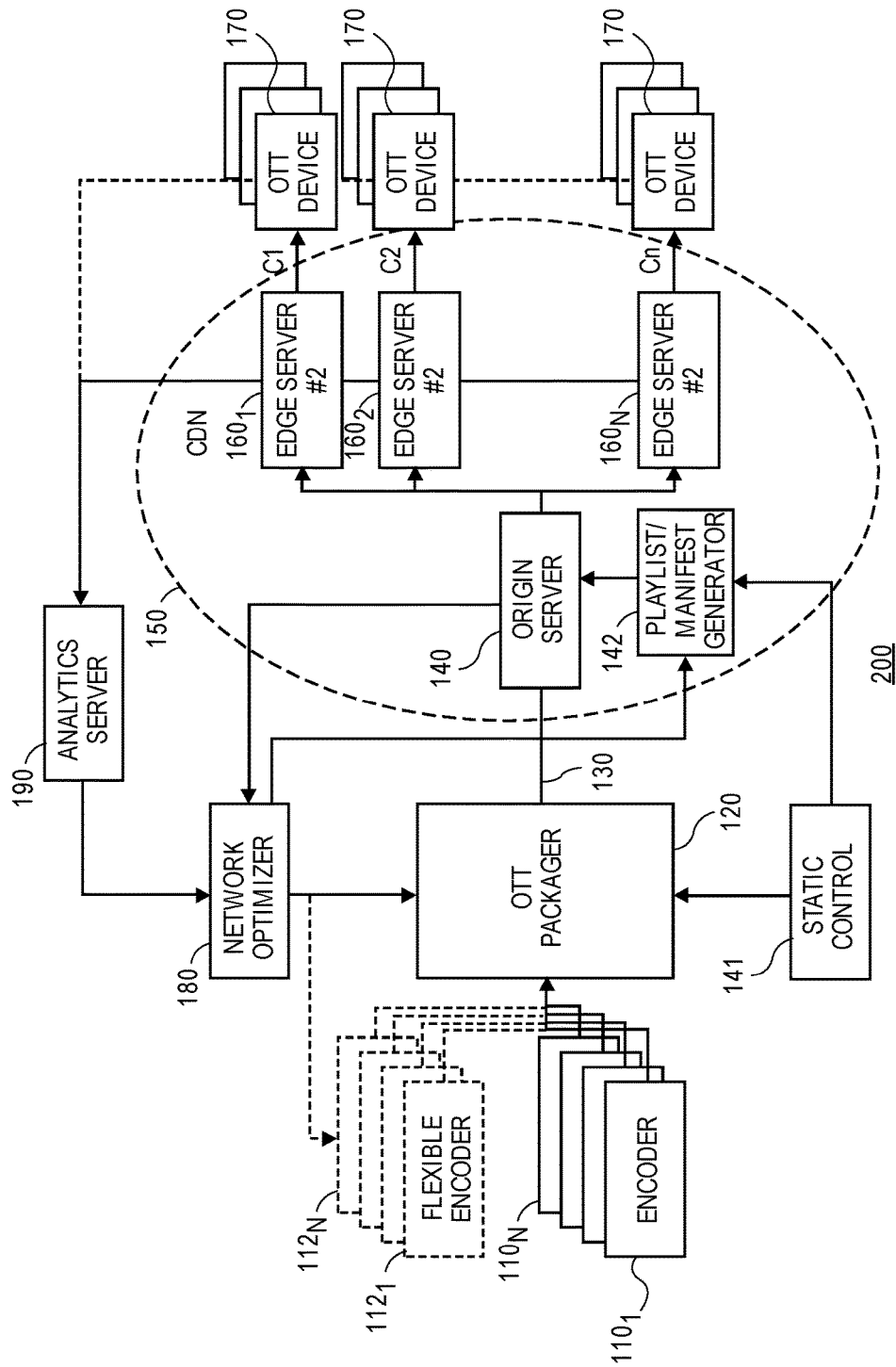
FIG. 2 is an illustrative Content Delivery Network (CDN) according to an embodiment of the invention.

FIG. 2 is an illustrative OTT platform 200 according to an embodiment of the invention. The OTT platform 200 depicted in FIG. 2 may be used to avoid overinvesting in the infrastructure necessary to support upload link 130.

OTT platform 200 comprises some of the same components as shown in the OTT platform 100 of FIG. 1. Therefore, one or more encoders 110, OTT packager 120, upload link 130, origin server 140, static control 141, playlist/manifest generator 142, Content Delivery Network 150, one or more edge servers 160, and one or more OTT devices 170 in the OTT platform 200 shown in FIG. 2 operate as explained above with reference to FIG. 1. OTT platform 200 of FIG. 2 also comprises the new components, network optimizer 180, analytics server 190, and flexible encoders $112_1$ ... $112_N$, which shall each be briefly described below.

Network optimizer 180 may be embodied by a computer system or by software executing upon physical hardware. Network optimizer 180 may retrieve bit rate utilization data from origin server 140, analyze the bit rate utilization data, and thereafter perform one or more responsive actions, such as but not limited to: instructing an encoder to encode digital video at an updated bit rate, instruct OTT packager 122 to adjust how manifest files are generated for one or more digital videos, and ensure that only relevant streams are uploaded onto upload link 130 by OTT packager 122. Additional details and description of the actions performed by, and the responsibilities of, network optimizer 180 will be provided below.

Analytics server 190 may be embodiment by a computer system or by software executing upon physical hardware. Analytics server 190 is responsible for collecting analytics information about activity occurring within CDN 150, particularly edge server $160_1$ ... $160_N$ and OTT devices 170 serviced thereby. Analytics server 190 may process the collected analytics information and may provide either the raw analytics information or the processed analytics information (or both) to network optimizer 180 to help inform the decisions made thereby. Note that in some embodiments, analytics server 190 may be implemented upon the same physical device as network optimizer 180, while other embodiments may implement them on separate physical devices.

Figure 4:
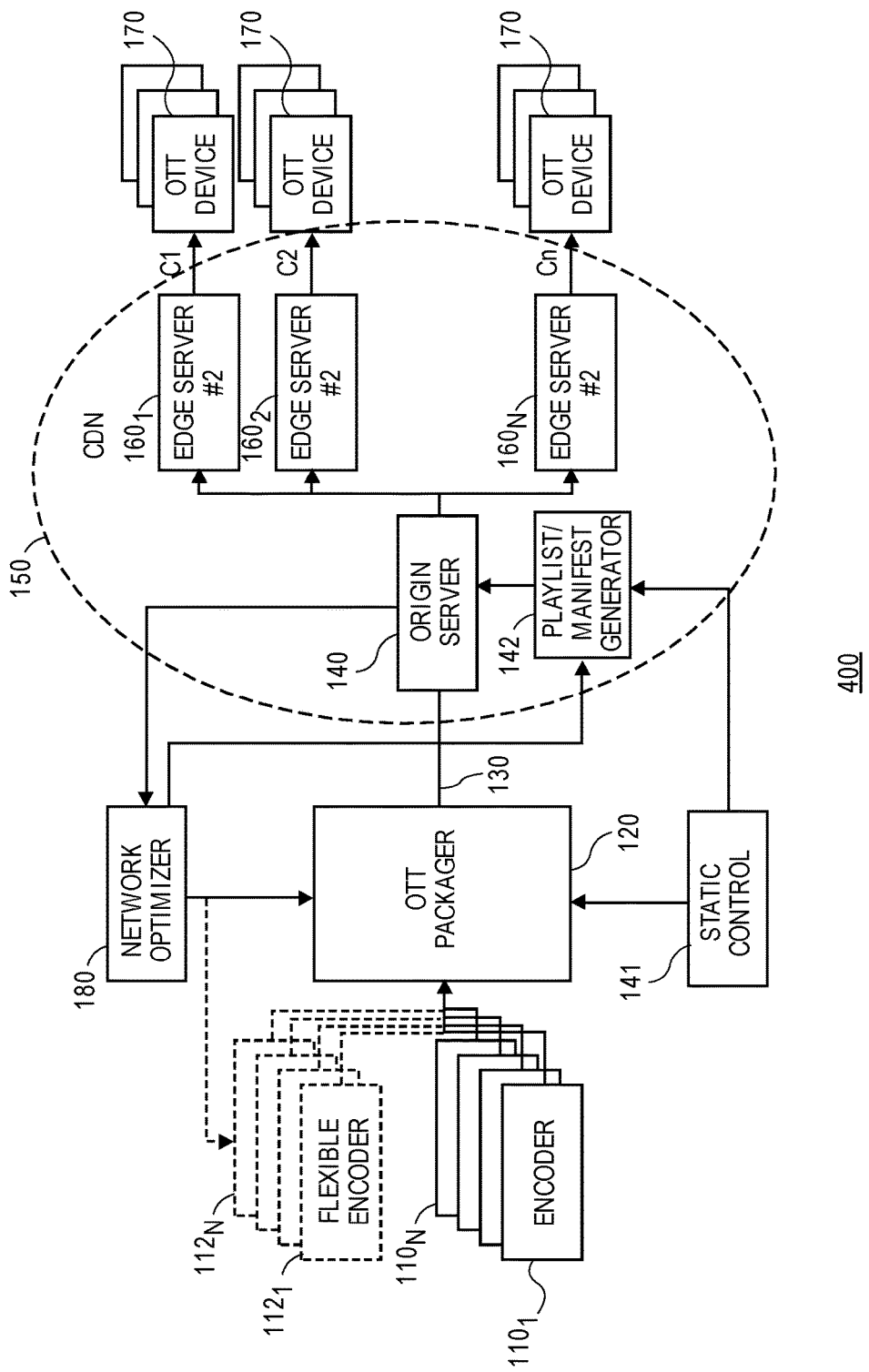
FIG. 4 is a second illustrative Content Delivery Network (CDN) according to an embodiment of the invention.

Playlist/manifest generator 142 is modified compared to playlist/manifest generators of the prior art in that playlist/manifest generator 142 of FIG. 2 and FIG. 4 may be dynamically instructed by network optimizer 180 to perform certain actions to reduce the load upon upload link 130 and/or CDN 150. Playlist/manifest generator 142 may also be instructed by static control 141 in some embodiments.

Embodiments of the invention may, but need not, include analytic server 190. To illustrate, while OTT platform 200 depicted in FIG. 2 comprises analytic server 190, other embodiments need not include analytic server 190. The OTT platform 400 of FIG. 4 is an example of an OTT platform that does not include an analytic server 190.

One or more flexible encoders $112_1$ ... $112_N$, as broadly used herein, represent a pool of additional encoders which may be utilized when needed. Flexible encoders $112_1$ ... $112_N$ may be used as a substitute to encoder 110, but may possess different settings (typically different/lower bit rates) in order to address a local or global congestion problem inside CDN 150.

Figure 3:
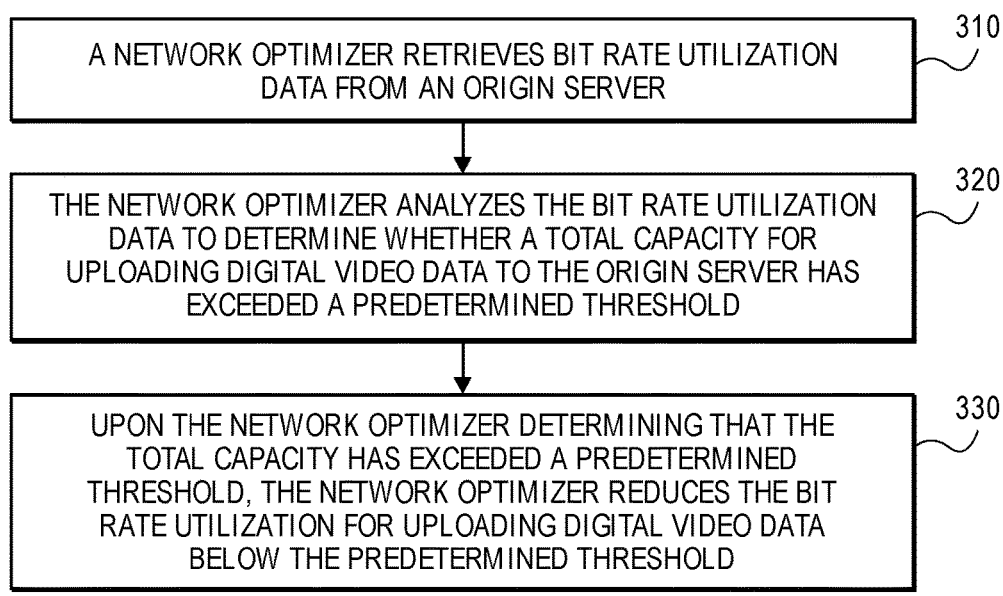
FIG. 3 is a flowchart depicting the steps of dynamically managing an operation of a content delivery network (CDN) according to an embodiment of the invention.

The operation of the OTT delivery platform 200 of FIG. 2 will be explained below with reference to FIG. 3, which is a flowchart depicting the steps of dynamically managing an operation of a content delivery network (CDN) according to an embodiment of the invention. In step 310, network optimizer 180 retrieves bit rate utilization data from origin server 140. Bit rate utilization data, as broadly used herein, refers to data that identifies, for each channel of upload link 130, a current bit rate amount being utilized by that channel and what digital video data is being uploaded to the content delivery network thereon.

In step 320, network optimizer 180 analyzes the bit rate utilization data to determine whether a total capacity of upload link 130 has exceeded a predetermined threshold. The threshold may be configured by an operator of network optimizer 180.

In step 330, if network optimizer 180 determines that the total capacity of upload link 130 has exceeded a predetermined threshold, then in response, network optimizer 180 may reduce the bit rate utilization of upload link 130 below the predetermined threshold. Network optimizer 180 may reduce the bit rate utilization of upload link 130 below the predetermined threshold in a variety of different manners. According to one embodiment, network optimizer 180 may reduce the bit rate utilization of upload link 130 by instructing one or more of flexible encoders $112_1 \ldots 112_N$ to encode a digital video at a reduced bit rate. OTT packager 120 may then include this digital video encoded at a bit rate in the transmittal of streams over upload link 130 so that the sum of the bit rates sent to CDN 150 over upload link 130 does not exceed a maximum value. The use of a flexible encoders 112 to encode a digital video stream, rather than using an encoder 110, allows the same content to be delivered but at a lower bitrate. Use of a flexible encoder 112 may be necessary or desirable if encoder 110 is encoding a stream that is also carried by another upload channel in addition to upload link 130.

In an alternate embodiment, rather than relying upon a flexible encoder 112, network optimizer 180 may instruct one or more encoders 110 to reduce the bit rate at which digital video is encoded, but a consequence of doing so is that any channels of upload link 130 carrying digital video encoded by that encoder 110 will also be impacted by the bitrate reduction. Such an embodiment may be useful if no flexible encoders 112 are available or if only a single channel of upload link 130 is carrying the digital video whose encoded bit rate has been reduced.

In another embodiment, network optimizer 180 may reduce the bit rate utilization of upload link 130 by instructing one or more representations to no longer be transmitted over upload link 130. To do so, network optimizer 180 may instruct one or more encoders 110 to cease producing the representations or may instruct OTT packager 120 to cease transmitting such representations over upload link 130 (which does not preclude the possibility that such representations, which are still being produced by one or more encoders 110, are transmitted over some other upload channel other than upload link 130. Playlist/manifest generator 142 shall also update the playlist/manifest accordingly to remove any representations no more available.

After receiving bit rate utilization data, network optimizer 180 may analyze the bit rate utilization data and undertake actions to enhance or optimize performance of OTT platform 200. For example, network optimizer 180 may update or correct the bit rate at which one or more encoders 110 or one or more flexible encoders 112 encode digital video. Thereafter, network optimizer 180 may configure the generation of manifest files by playlist/manifest generator 142 to properly reference the encoded digital video streams produced by encoders 110 and potentially encoders 112. Further, network optimizer 180 may ensure that only relevant digital video streams are uploaded to CDN 150 over upload link 130 by OTT packager 120.

Managing Load Throughout the CDN

Embodiments may mitigate and address problems associated with excessive load at various locations within CDN 150. To do so, embodiments may employ analytics server 190 to identify, in real-time, particular regions (such as a portion of CDN 150 near one or more edge servers) which are experiencing operational issues due to excessive load. Advantageously, embodiments may respond in real-time to reduce the load placed upon certain regions of CDN 150 in a targeted fashion without altering the operation of other regions of CDN 150 which are not experiencing any issues due to excessive load.

Analytic server 190 may be used to collected consumption information about bit rate consumption across CDN 150. The collected consumption information may be provided to network optimizer 180, which may subsequently analyze the consumption information to determine if any portions of CDN 150 are experiencing excessive load. If network optimizer 180 so determines, then network optimizer 180 may perform a variety of actions designed to reduce the load upon CDN 150 in those regions presently experiencing excessive load. For example, network optimizer 180 may instruct OTT packager 120 to drop certain representations deemed too expensive in terms of bit rate which are adversely affecting particular regions within CDN 150. The Network Optimizer 180 must consistently instruct the Playlist/manifest generator 142. The collected consumption information may also be used to instruct one or more flexible encoders 112 to begin producing a lower bit rate version of any representations deemed too expensive in terms of bit rate, either for a particular region or portion of CDN 150 or across the CDN 150 in its entirety. In this fashion, the operation of OTT platform 200 may adapt dynamically by collecting consumption information, which includes quality of experience (QoE) and bandwidth data, from OTT devices 170 or from edge servers 160 and automatically adjusts the encoding parameters of encoders 110, and potentially encoders 112, to reduce buffering, profile switching, and other QoE metrics.

Note that manifest files may be different from one region or portion of CDN 150 to another region or portion of CDN 150, even if all representations are available at origin server 140. Thus, in another embodiment, network optimizer 180 may reduce the load placed upon a particular region within CDN 150 by instructing one or more representations, sent to the affected area, to no longer be transmitted over upload channel 130. To do so, network optimizer 180 may instruct one or more encoders 110 to cease producing the representations or may instruct OTT packager 120 to cease transmitting such representations over upload link 130 (which does not preclude the possibility that such representations, which are still being produced by one or more encoders 110, continue to be transmitted to other areas of CDN 150 which are not presently experiencing heavy load. The playlist/manifest generator 142 shall also update the playlist/manifest accordingly to remove the representations for particular regions of CDN 150 which are no more available.

To illustrate a concrete example of network optimizer 180 improving the global qualify of experience (QoE) of OTT platform 200, assume that the operator of OTT platform 200 shown in FIG. 2 configures a profile ladder for the OTT platform 200 to be 3 Mb/s, 2 Mb/s and 1 Mb/s. The profile ladder is used to determine the bandwidth requirements to properly view digital video served to a particular OTT device 170. For example, at some initial point in time, a set of OTT devices in a set of regions may initially have a profile ladder that identifies that the OTT devices 170 are in the highest quality category, and should be served digital video at 3 Mb/s. If, at some later point of time (e.g., at prime time), the average bandwidth available to a particular set of OTT devices 170 in one or more regions is 2.7 Mb/s, most of the clients in those regions will switch to the 2 Mb/s profile and won't get the optimal video experience.

In OTT platform 200, using the analytical information collected from both edge servers 160 and OTT clients 170, network optimizer 180 may automatically discover that the common available bandwidth in those regions is 2.7 Mb/s. As a result of this discovery, various strategies can be applied. According to one responsive strategy, the 3 Mb/s service bit rate in the profile ladder may be updated to 2.7 Mb/s for all OTT devices 170 by just changing the configuration of one or more encoders 110 and playlist/manifest generator 142 updating the associated playlist/manifest information when necessary. Making this adjustment to the configuration of encoders 110 will yield a better QoE for OTT devices 170 located in the previously congested region(s) but would degrade a bit the QoE for the other regions, as the bit rate at which these encoders 110 would encode digital video would be downwardly adjusted from 3 Mb/s to 2.7 Mb/s.

According to an alternate responsive strategy, a flexible encoder 112 may be instructed to generate a 2.7 Mb/s stream that should then be referenced in any manifest file or playlist sent to the congested region. This mechanism of delivering particular manifest file to a particular set of OTT devices 170 is well-known but is used for other purposes (such as to present only the sub-list of representations that a given OTT device 170 can support).

Embodiments thus use real time QoE information obtained from OTT devices 170 and from edge servers 160 to optimize video streaming. While today, setting the profile ladder in ABR/OTT system 100 is done by hand, as nobody knows what the best set of profiles is and how to configure an encoder to obtain optimal streaming. Embodiments provide a mechanism to adjust the profile ladder dynamically over time and in a differentiated way for different regions and edge servers 160. Advantageously, embodiments provide for enhanced OTT platform 200 network utilization for operators and enhanced video quality for the end user of OTT devices 170.

Implementing Mechanisms

Figure 5:
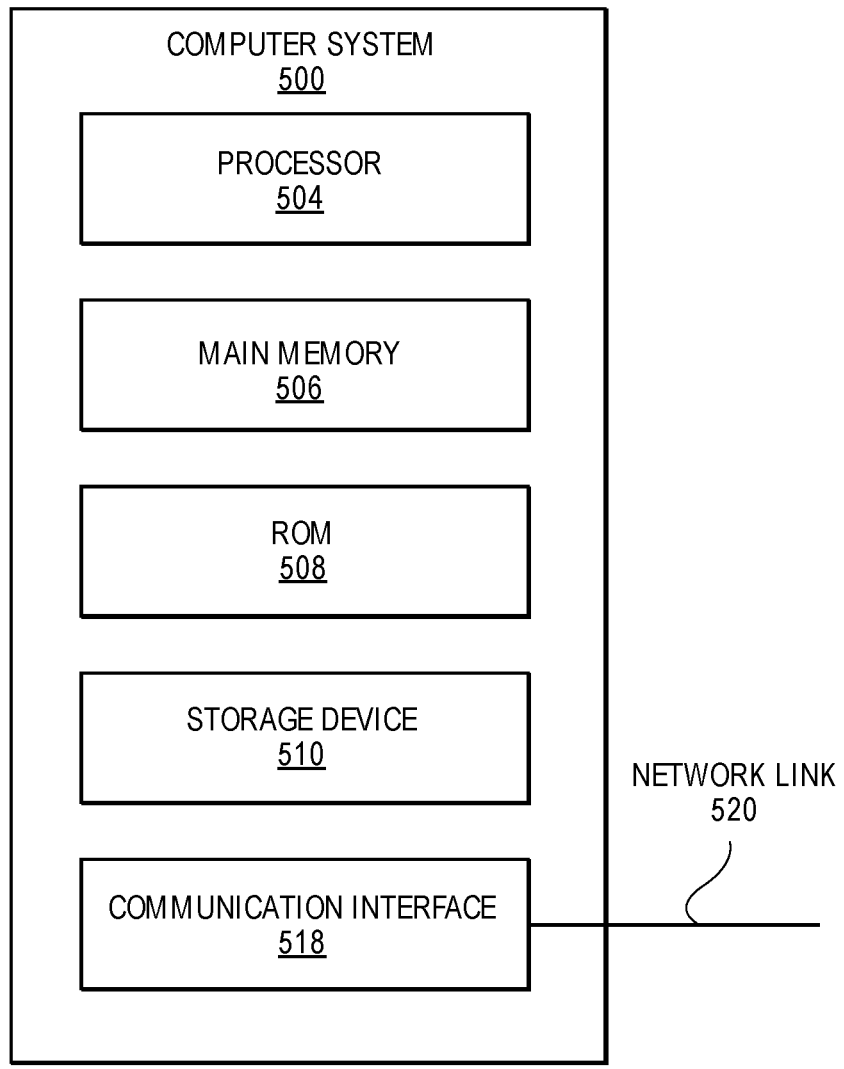
FIG. 5 is a block diagram of a computer system which may be used to implement various physical devices within a Content Delivery Network (CDN) according to an embodiment of the invention.

FIG. 5 is a block diagram of a computer system which may be used to implement various physical devices within an OTT platform 200 according to an embodiment of the invention. In an embodiment, computer system 500 includes processor 504, main memory 506, ROM 508, storage device 510, and communication interface 518. Computer system 500 includes at least one processor 504 for processing information. Computer system 500 also includes a main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device for storing static information and instructions for processor 504. A storage device 510, such as a magnetic disk or optical disk, is provided for storing information and instructions.

Embodiments of the invention are related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory computer-readable storage medium" as used herein refers to any tangible, physical medium that participates in persistently storing instructions which may be provided to processor 504 for execution. Non-limiting, illustrative examples of non-transitory machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read. The term "non-transitory computer-readable storage medium" does not include a signal or any transitory propagation medium.

Various forms of non-transitory machine readable media may be involved in carrying one or more sequences of one or more instructions to processor 504 for execution. For example, the instructions may initially be carried on a magnetic disk of a remote computer. The remote computer can load the instructions into its dynamic memory and send the instructions over a network link 520 to computer system 500.

Communication interface 518 provides a two-way data communication coupling to a network link 520 that is connected to a local network. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through a local network to a host computer or to data equipment operated by an Internet Service Provider (ISP).

Computer system 500 can send messages and receive data, including program code, through the network(s), network link 520 and communication interface 518. For example, a server might transmit a requested code for an application program through the Internet, a local ISP, a local network, subsequently to communication interface 518. The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer readable storage mediums storing one or more sequences of instructions for dynamically managing an operation of an Over-The-Top (OTT) delivery network, which when executed by one or more processors, cause:
dynamically adjusting a utilization of a bit rate capacity of a plurality of channels of an upload link for uploading digital video data from an Over-The-Top (OTT) packager to an origin server of a content delivery network (CDN), which comprises a plurality of edge servers which each deliver digital video content to a plurality of devices, by:
  (a) a network optimizer, retrieving from said origin server, bit rate utilization data for each of said plurality of channels of said upload link, wherein said bit rate utilization data identifies a current bit rate amount being utilized by each of said plurality of channels of the upload link and what digital video data is being uploaded to the content delivery network thereon,
  (b) the network optimizer analysing said bit rate utilization data to determine whether a total capacity of said upload link for uploading digital video data from said OTT packager to said origin server has exceeded a predetermined threshold, and
  (c) upon the network optimizer determining that said total capacity of said upload link has exceeded a predetermined threshold, said network optimizer instructing one or more of (a) OTT packager and (b) one or more playlist/manifest generator and (c) encoders that supply encoded digital video to said OTT packager, wherein said network optimizer instructing causes a reduction in the bit rate utilization of said upload link below said predetermined threshold.

2. The one or more non-transitory computer readable storage mediums of claim 1, wherein at least one channel of said upload link carries either a constant bit rate (CBR) or variable bit rate (VBR) stream or a capped variable bit rate stream (cappedVBR).

3. The one or more non-transitory computer readable storage mediums of claim 1, wherein said one or more encoders encode a set of digital content at a first bit rate, and wherein said network optimizer instructing comprises:
said network optimizer instructing one or more flexible encoders, separate from said one or more encoders, to encode said digital content at a second bit rate which is less than said first bit rate, and
wherein dynamically adjusting a utilization of a bit rate capacity of said plurality of channels of said upload link further comprises:
said OTT packager dynamically transmitting, over said upload channel, a first stream comprising said digital content encoded at said first bit rate and a second stream comprising said digital content encoded at said second bit rate.

4. The one or more non-transitory computer readable storage mediums of claim 1, wherein said one or more encoders are of a first type of encoders, and wherein said network optimizer instructing comprises:
upon determining that no encoders of a second type are available, said network optimizer instructing at least one of said one or more encoders to cease encoding one or more representations of digital content deemed to be too expensive in terms of bit rate.

5. The one or more non-transitory computer readable storage mediums of claim 1, wherein dynamically adjusting said utilization of said bit rate capacity of said plurality of channels of said upload link further comprises:
gathering consumption information about bit rate consumption across the content delivery network; and
instructing said OTT packager to cease sending, over said upload link, one or more representations based on said consumption information.

6. The one or more non-transitory computer readable storage mediums of claim 1, wherein dynamically adjusting a utilization of a bit rate capacity of said upload link further comprises:
gathering consumption information about bit rate consumption across the content delivery network; and
instructing, based on said consumption information, one or more flexible encoders to encode a lower bit rate version of a particular representative currently being encoded by said one or more encoders.

7. The one or more non-transitory computer readable storage mediums of claim 1, wherein execution of the one or more sequences of instructions further cause:
dynamically adjusting a profile ladder in a differentiated manner for two or more edge servers.

8. One or more non-transitory computer readable storage mediums storing one or more sequences of instructions for dynamically managing an operation of an Over-The-Top (OTT) delivery network, which when executed by one or more processors, cause:
dynamically adjusting a traffic load placed upon an overloaded portion of a content delivery network (CDN) by:
  (a) identifying that said overloaded portion of said CDN is currently experiencing a traffic load that exceeds a predetermined threshold; and
  (b) adjusting a set of representations, provided to one or more edge servers in said overloaded portion of CDN by an origin server, in response identifying that said overloaded portion is currently experiencing said traffic load in excess of said predetermined threshold, without adjusting which representations are provided to edge servers in other portions of said CDN,
wherein said adjusted set of representations provided to said one or more edge servers in said overloaded portion are encoded by a set of flexible encoders which are separate and distinct from a set of encoders responsible for encoding digital video served to other portions of said CDN other than said overloaded portion.

9. The one or more non-transitory computer readable storage mediums of claim 8, wherein adjusting said set of representatives comprises instructing at least one encoder to cease encoding one or more representations of digital content deemed to be too expensive in terms of bit rate.

10. The one or more non-transitory computer readable storage mediums of claim 8, wherein said overloaded portion of said CDN is identified as presently experiencing said traffic load in excess of said predetermined threshold by analysing gathered consumption information which describes bit rate consumption of OTT devices from edge servers from across said CDN.

11. The one or more non-transitory computer readable storage mediums of claim 8, wherein execution of the one or more sequences of instructions further cause:
dynamically adjusting a profile ladder for an edge server in said overloaded portion of said CDN based on said adjusted set of representatives.

12. A system for dynamically managing an operation of an Over-The-Top (OTT) delivery network, comprising:
one or more processors; and
one or more non-transitory computer-readable storage mediums that store one or more sequences of instructions, which when executed by the one or more processors, cause:
dynamically adjusting a utilization of a bit rate capacity of a plurality of channels of an upload link for uploading digital video data from an Over-The-Top (OTT) packager to an origin server of a content delivery network (CDN), which comprises a plurality of edge servers which each deliver digital video content to a plurality of devices, by:
(a) a network optimizer, retrieving from said origin server, bit rate utilization data for each of said plurality of channels of said upload link, wherein said bit rate utilization data identifies a current bit rate amount being utilized by each of said plurality of channels of the upload link and what digital video data is being uploaded to the content delivery network thereon,
(b) the network optimizer analysing said bit rate utilization data to determine whether a total capacity of said upload link for uploading digital video data from said OTT packager to said origin server has exceeded a predetermined threshold, and
(c) upon the network optimizer determining that said total capacity of said upload link has exceeded a predetermined threshold, said network optimizer instructing one or more of (a) OTT packager and (b) one or more playlist/manifest generator and (c) encoders that supply encoded digital video to said OTT packager, wherein said network optimizer instructing causes a reduction in the bit rate utilization of said upload link below said predetermined threshold.

13. The system of claim 12, wherein said one or more encoders encode a set of digital content at a first bit rate, and wherein said network optimizer instructing comprises:
said network optimizer instructing one or more flexible encoders, separate from said one or more encoders, to encode said digital content at a second bit rate which is less than said first bit rate, and
wherein dynamically adjusting a utilization of a bit rate capacity of said plurality of channels of said upload link further comprises:
said OTT packager dynamically transmitting, over said upload channel, a first stream comprising said digital content encoded at said first bit rate and a second stream comprising said digital content encoded at said second bit rate.

14. The system of claim 12, wherein dynamically adjusting said utilization of said bit rate capacity of said plurality of channels of said upload link further comprises:
gathering consumption information about bit rate consumption across the content delivery network; and
instructing said OTT packager to cease sending, over said upload link, one or more representations based on said consumption information.

15. A system for dynamically managing an operation of an Over-The-Top (OTT) delivery network, comprising:
one or more processors; and
one or more non-transitory computer-readable storage mediums that store one or more sequences of instructions, which when executed by the one or more processors, cause:
dynamically adjusting a traffic load placed upon an overloaded portion of a content delivery network (CDN) by:
(a) identifying that said overloaded portion of said CDN is currently experiencing a traffic load that exceeds a predetermined threshold; and
(b) adjusting a set of representations, provided to one or more edge servers in said overloaded portion of CDN by an origin server, in response identifying that said overloaded portion is currently experiencing said traffic load in excess of said predetermined threshold, without adjusting which representations are provided to edge servers in other portions of said CDN,
wherein said adjusted set of representations provided to said one or more edge servers in said overloaded portion are encoded by a set of flexible encoders which are separate and distinct from a set of encoders responsible for encoding digital video served to other portions of said CDN other than said overloaded portion.

16. The system of claim 15, wherein execution of the one or more sequences of instructions further cause:
dynamically adjusting a profile ladder for an edge server in said overloaded portion of said CDN based on said adjusted set of representatives.

17. A method for dynamically managing an operation of an Over-The-Top (OTT) delivery network, comprising:
dynamically adjusting a utilization of a bit rate capacity of a plurality of channels of an upload link for uploading digital video data from an Over-The-Top (OTT) packager to an origin server of a content delivery network (CDN), which comprises a plurality of edge servers which each deliver digital video content to a plurality of devices, by:
(a) a network optimizer, retrieving from said origin server, bit rate utilization data for each of said plurality of channels of said upload link, wherein said bit rate utilization data identifies a current bit rate amount being utilized by each of said plurality of channels of the upload link and what digital video data is being uploaded to the content delivery network thereon,
(b) the network optimizer analysing said bit rate utilization data to determine whether a total capacity of said upload link for uploading digital video data from said OTT packager to said origin server has exceeded a predetermined threshold, and (c) upon the network optimizer determining that said total capacity of said upload link has exceeded a predetermined threshold, said network optimizer instructing one or more of (a) OTT packager and (b) one or more playlist/manifest generator and (c) encoders that supply encoded digital video to said OTT packager, wherein said network optimizer instructing causes a reduction in the bit rate utilization of said upload link below said predetermined threshold.

18. A method for dynamically managing an operation of an Over-The-Top (OTT) delivery network, comprising:
dynamically adjusting a traffic load placed upon an overloaded portion of a content delivery network (CDN) by:
(a) identifying that said overloaded portion of said CDN is currently experiencing a traffic load that exceeds a predetermined threshold; and
(b) adjusting a set of representations, provided to one or more edge servers in said overloaded portion of CDN by an origin server, in response identifying that said overloaded portion is currently experiencing said traffic load in excess of said predetermined threshold, without adjusting which representations are provided to edge servers in other portions of said CDN,
wherein said adjusted set of representations provided to said one or more edge servers in said overloaded portion are encoded by a set of flexible encoders which are separate and distinct from a set of encoders responsible for encoding digital video served to other portions of said CDN other than said overloaded portion.

* * * * *